M. GEHRE.
DEVICE FOR MEASURING STEAM AND OTHER FLUIDS.
APPLICATION FILED DEC. 8, 1910.

1,166,980.

Patented Jan. 4, 1916.

UNITED STATES PATENT OFFICE.

MAX GEHRE, OF DUSSELDORF-RATH, GERMANY.

DEVICE FOR MEASURING STEAM AND OTHER FLUIDS.

1,166,980. Specification of Letters Patent. Patented Jan. 4, 1916.

Application filed December 8, 1910. Serial No. 596,312.

*To all whom it may concern:*

Be it known that I, MAX GEHRE, a citizen of the German Empire, residing at Dusseldorf-Rath, Germany, have invented certain new and useful Improvements in Devices for Measuring Steam and Other Fluids, of which the following is a specification.

The present invention relates to a measuring device more particularly for the measurement of steam and bearing on that class of measuring devices in which the measurement indications depend on the adjustment of a member which is under the influence of the difference between the pressure in front and in the rear of a narrowed or throttled portion of the conduit for the medium to be measured.

The object of the invention is attained by taking care to enable the member adjusted under the influence of the pressure-difference in front and in the rear of the throttled place in the conduit, to follow without substantial obstruction all pressure fluctuations, and the indicating members to indicate solely the average positions of the adjusting member.

Figure 1:
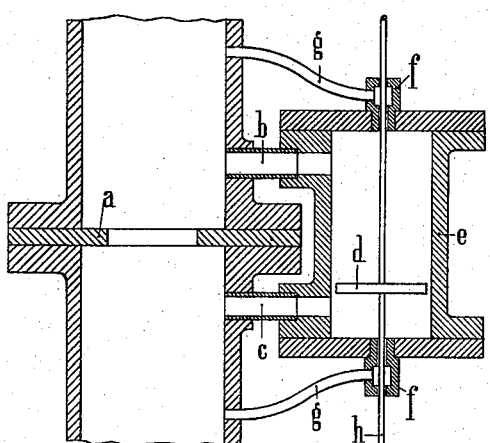
Figure 2:
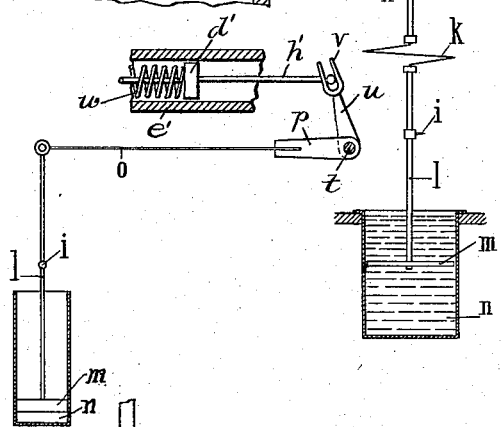
Figure 3:
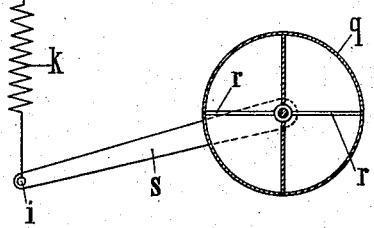

The invention is illustrated by way of example in the accompanying drawing in which:

Figure 1 is a diagrammatical view of the arrangement and Figs. 2 and 3 show constructional modifications of the connection between the adjusting and the indicating member of the meter.

According to Fig. 1 a throttle $a$ is inserted in the conduit. At each side of the throttle sockets $b$ and $c$ branch respectively from the conduit and lead to opposite ends of a cylinder $e$. Loosely fitted in the cylinder $e$ is a piston $d$ forming the adjusting member of the meter. Between the upper face of piston $d$ and the top wall of cylinder $e$ there is interposed a spring or other device suitably adjusted so that the movements of the piston $d$ will be characteristic of the quantity of fluid flowing through the conduit containing the throttle $a$, such spring or other device being omitted from Fig. 1, since such devices are well known in apparatus of this kind.

$f$ designates two narrow cylindrical chambers or glands communicating through pipes $g$ with the main conduit for the medium to be measured. The piston rod $h$ of the piston $d$ extends through and beyond the glands $f$. $i$ is the indicator (pen, stylus, or the like) which is connected with the piston rod $h$ by means of a spring $k$. As shown in the drawing the indicator $i$ is arranged on a rod $l$ carrying a piston $m$ which is arranged in a vessel containing liquid $n$.

The operation of the device is as follows: The piston $d$ takes its position in the cylinder $e$ under the influence of the difference between the pressures in front and in the rear of the throttle $a$ and the tension of the above mentioned spring or other device, not illustrated. The annular space between the piston and the cylinder wall counteracts any disturbing influence of the friction on the cylinder wall. This free annular space moreover supplements the restricted passage through the throttle $a$. The friction of the piston rod $h$ in the guides of the glands $f$ is immaterial since the supply to these glands from the main conduit renders a tight packing of the glands unnecessary and counteracts the leakage of fluid from the interior of the cylinder $e$. The movement of the piston rod $h$ is transmitted by the spring $k$ to the rod $l$ carrying the indicator $i$. The tension of the spring $k$ is so chosen as to overcome the friction of the stylus $i$ and of the piston $m$ in the liquid $n$. Owing to the interposition of the spring $k$ between the piston $d$ and the stylus $i$ the piston $d$ is able to reciprocate under the influence of pressure shocks without encountering any appreciable resistance on the part of the weak spring $k$. The stylus $i$ is hardly reached or influenced by the pressure shocks at all. The stylus however follows with perfection all pressure variations in the conduit which are not brought about merely by pressure shocks as the weak spring $k$ is nevertheless strong enough to overcome the damping influence of the piston $m$ located in the liquid $n$. That is, when the piston $d$ moves slowly, it carries with it the indicator $i$, the distance between the two remaining constant, notwithstanding that the spring $k$ connects the two, since the spring $k$ while weak enough to yield to sudden shocks is strong enough to carry the pointer $i$ and the piston $m$. The spring $k$ has no connection at its lower end to any fixed point and is therefore normally not under strain, or is in what may be termed a "strainless" condition.

In the place of the coil spring $k$ any other spring may of course be interposed between the adjusting member and the indicating member such as for instance a leaf spring $o$ shown in Fig. 2 where it is assumed that the movement of the piston is converted into a rotary movement of an arm $p$ attached to the spring $o$, by any suitable connection between the piston rod $h$ and the shaft carrying the arm $p$. The stylus is again designated by $i$ and is arranged on a rod $l$ which is under the influence of the dash-pot device. Arm $p$ is shown in Fig. 2 of the drawing as firmly mounted on a shaft $t$ carrying an arm $u$ having forked ends $v$. Coöperating with the forked ends $v$ of arm $u$ is rod $h'$ of piston $d'$ in cylinder $e'$. Piston $d'$ is shown as connected with spring $w$ in cylinder $e'$. Cylinder $e'$ is assumed to be connected with the steam conduit in the same manner as cylinder $e$ of Fig. 1. The higher pressure operates on the right side of piston $d'$ and the lower pressure on the left side, so that the higher pressure in counter-acted by spring $w$, and for each pressure difference piston $d'$ tends to assume a definite position within cylinder $e'$ under the influence of the steam pressure on the right side and the spring pressure on the left side.

According to Fig. 3 a coil spring $k$ is again interposed between the piston rod $h$ and the stylus $i$ as in Fig. 1; but the braking or dash-pot effect is brought about by rotary wings $r$ in a cylinder $q$. These wings are attached to a lever $r$ which carries the indicator $i$ and is connected to the spring $k$.

What I claim is:—

1. In a device for measuring steam and other fluids, an adjusting member under the control of the difference of pressures in front and in the rear of a throttled portion in the conduit conveying the medium to be measured, an indicating member, and a strainless yielding or resilient connection between said adjusting member and said indicating member.

2. In a device for measuring steam and other fluids, an adjusting member under the control of the difference of pressures in front and in the rear of a throttled portion in the conduit conveying the medium to be measured, an indicating member, a strainless yielding or resilient connection between said adjusting member and said indicating member, and a damping device adapted to damp the movements of the indicating device communicated to it by the yielding device.

3. In a device for measuring steam and other fluids, a cylinder, a pistonlike body adjustably mounted within said cylinder leaving free a portion of the cross section of said cylinder and forming an adjusting member, a piston rod connected to said piston and passing through the end walls of said cylinder, means for preventing leakage of fluid from the interior of said cylinder along the piston rod, an indicating member and connecting means between said adjusting and said indicating member, said cylinder communicating at opposite ends with the conduit conveying the medium to be measured at points positioned on opposite sides of a throttled portion, so as to bring said adjusting member under the control of the difference of pressures on opposite sides of the throttled portion within the medium conveying conduit.

4. In a device for measuring steam and other fluids, a cylinder, a pistonlike body adjustably mounted within said cylinder leaving free a portion of the cross section of said cylinder and forming an adjusting member, an indicating member, a strainless yielding or resilient connection between said adjusting member and said indicating member, said cylinder containing the adjusting member communicating at opposite ends with the conduit conveying the medium to be measured at points positioned on opposite sides of a throttled portion, so as to bring said adjusting member under the control of the difference of pressures on opposite sides of the throttled portion within the medium conveying conduit.

5. In a device for measuring steam and other fluids, a cylinder, a pistonlike body adjustably mounted within said cylinder leaving free an annular space between its periphery and the cylinder wall and forming an adjusting member, a piston rod connected to said piston and passing through the end walls of said cylinder, means for preventing leakage of fluid from the interior of said cylinder along the piston rod, an indicating member, a strainless yielding or resilient connection between said adjusting member and said indicating member, and a damping device adapted to damp the movements of the indicating device communicated to it by the yielding device, said cylinder communicating at opposite ends with the conduit conveying the medium to be measured at points positioned on opposite sides of a throttled portion, so as to bring said adjusting member under the control of the difference of pressures on opposite sides of the throttled portion within the medium conveying conduit.

In testimony whereof, I affix my signature in presence of two witnesses.

MAX GEHRE.

Witnesses:
 HENRY HASPER,
 WOLDEMAR HAUPT.

Copies of this patent may be obtained for five cents each, by addressing the "Commissioner of Patents, Washington, D. C."